United States Patent [19]

Loreth

[11] Patent Number: 5,852,079

[45] Date of Patent: Dec. 22, 1998

[54] RUBBER COMPOSITION FOR TIRES

[75] Inventor: Wolfgang Loreth, Lauenau, Germany

[73] Assignee: Continental Aktiengesellschaft, Hanover, Germany

[21] Appl. No.: 816,995

[22] Filed: Mar. 14, 1997

[30] Foreign Application Priority Data

Mar. 16, 1996 [DE] Germany .......................... 196 10 375.4

[51] Int. Cl.$^6$ ...................................................... C08L 1/00
[52] U.S. Cl. ............................................................ 524/35
[58] Field of Search ................................................. 524/35

[56] References Cited

U.S. PATENT DOCUMENTS 3,802,478   4/1974   Boustany et al. ...................... 152/357

FOREIGN PATENT DOCUMENTS

| 0728807 | 2/1996 | European Pat. Off. . |
| 4005493 | 8/1990 | Germany . |
| 4117621 | 12/1994 | Germany . |
| 4110211 | 4/1992 | Japan . |

*Primary Examiner*—Edward J. Cain
*Attorney, Agent, or Firm*—Robert W. Becker & Associates

[57] ABSTRACT

A rubber composition for tire treads includes a rubber mixture and a fiber mixture of cellulose fibers and keratin fibers in a weight ratio of 1:5 to 5:1 mixed into the rubber mixture. The fiber mixture is present in the rubber composition in 2 to 25 parts by weight per 100 parts by weight of rubber. The keratin fibers are preferably wool fibers, animal hair, and animal bristles and the cellulose fibers are preferably cotton fibers and coco fibers.

10 Claims, No Drawings

RUBBER COMPOSITION FOR TIRES

BACKGROUND OF THE INVENTION

The present invention relates to a rubber composition for a tire tread of a tire, especially for a snow tire. The invention relates furthermore to a tire with a tire tread that is comprised at least partially of such a rubber composition.

A plurality of suggestions is known from the prior art, especially also from published patent applications, in regard to rubber compositions for tire treads, according to which different materials are to be mixed into the rubber mixture in order to improve the driving properties of the tire under winter driving conditions, for example, traction and braking properties on snowy or icy road surfaces or grip on wet road surfaces. Especially the admixture of naturally occurring materials of plant or animal origin has been suggested in the recent past because of their environmental compatibility or lack of toxicity.

From German Patent Application 40 05 493 it is known to add leather in powder form or gelatin powder to a rubber mixture that is to be used for tire treads of snow tires. Gelatin is a water-soluble substance which is difficult to compound with rubber mixtures and must be considered as incompatible with rubber. Leather contains a certain amount of water, is a hydrophilic material, absorbs and swells in water, and is thus also incompatible with rubber. For leather as well as gelatin it was found that such materials is removed relatively easily from the surface of the tire tread. This diminishes the effect of such materials and also decreases the wear resistance of the tire tread.

From the yet unpublished European patent application 96890017.5 it is known to admix keratin in the form of fibers or powders to a rubber mixture for a tire tread of a snow tire. The keratin fibers can be especially in the form of animal hair, respectively, animal bristles. The snow and ice properties of such tire tread mixtures can be substantially improved by admixture of keratin fibers or keratin powder, especially with respect to grip, for example, traction on snow and braking on snow and ice.

It is therefore an object of the present invention to improve further the winter (snow and ice) performance, especially traction on snow and ice, of tire treads, respectively, tire tread mixtures by admixing naturally occurring and thus environmentally friendly and toxicologically innocuous materials. The other desirable properties of tire treads, for example, wear resistance and rolling resistance, should be maintained.

SUMMARY OF THE INVENTION

A rubber composition for a tire tread according to the present invention comprises a rubber mixture, containing rubber and additives, and a fiber mixture containing cellulose fibers and keratin fibers in a weight ratio of 1:5 to 5:1 mixed into the rubber mixture.

The weight ratio preferably is 3:7 to 2:1.

The fiber mixture is preferably present in the rubber composition in 2 to 25 parts by weight per 100 parts by weight of rubber.

Advantageously, the fiber mixture is present in the rubber composition in 5 to 15 parts by weight per 100 parts by weight of rubber.

Preferably, the keratin fibers are selected from the group consisting of wool fibers, animal hair, and animal bristles.

Preferably, the cellulose fibers are selected from the group consisting of cotton fibers and coco fibers.

The keratin fibers have preferably a length of 0.5 to 30 mm and most preferred a length of 5 to 10 mm.

The cellulose fibers may have a length of 0.5 to 30 mm and preferably a length of 5 to 10 mm.

The present invention also relates to a tire having a tire tread comprised at least partially of a vulcanized rubber composition of the invention.

According to the present invention, the rubber composition comprises a fiber mixture consisting of cellulose fibers and keratin fibers in a weight ratio in the range of 1:5 to 5:1, especially 3:7 to 2:1.

Surprisingly it was found that the admixture of the inventive fiber mixture improves the winter driving performance or properties of a tire tread mixture, especially grip, traction, and braking behavior on snowy or icy surfaces, significantly. Keratin as a hydrophobic and thus rubber-compatible material most likely effects a micro roughness of the surface of the tire tread that is favorable with respect to the aforementioned properties. Cellulose is a hygroscopic substance which, during braking or acceleration on icy or snowy surfaces, probably will interact with the thin water film forming between the tire tread and the road surface so that the skid resistance is increased. Furthermore, it was found that by admixing of the inventive fiber mixture, other tire and tread properties, for example, wear resistance, are not negatively effected.

It should be noted in this context that the term keratin fibers and cellulose fibers includes especially such fibers that contain keratin or cellulose as a major constituent i.e., may contain amounts of other materials.

The aforementioned improvement of properties is especially noticeable in a range when the proportion of fiber mixture is 2 to 25 parts by weight, especially 5 to 15 parts by weight, relative to 100 parts by weight rubber.

According to a preferred embodiment of the invention the keratin fibers include wool fibers, hair, especially animal hair or animal bristles, alone or in any desired combination. These naturally occurring materials are available in sufficient amounts whereby sheep wool or pig bristles have been proven to be especially suitable materials. Such keratin fibers are often also encountered as production waste of different products so that the use of such fibers is especially environmentally friendly and also inexpensive.

Cellulose fibers may include, for example, coco fibers or cotton fibers, alone or in any desired combination thereof. It is also possible to use cellulose fibers in the form of production waste as a fiber component in the present invention.

The fibers, including the keratin fibers as well as the cellulose fibers, are preferably used in a length of 0.5 to 30 mm, especially 5 to 10 mm for admixture in the rubber mixture. This ensures excellent workability of the resulting rubber composition for further production processes. The fiber mixture, however, may also contain fibers of different lengths. The admixture of keratin fibers and cellulose fibers of different origin is possible.

The present invention also relates to a tire having a tire tread that is at least partly comprised of the vulcanized inventive rubber composition.

DESCRIPTION OF PREFERRED EMBODIMENTS

The present invention will now be described in detail with the aid of several specific embodiments utilizing the attached table.

The table shows a plurality of mixing examples, for example, a base mixture that does not contain fibers, a first comparative example that contains fibers only in the form of keratin fibers, especially, pig bristles, a comparative example 2 that contains only cellulose fibers in the form of coco fibers, and an inventive rubber composition containing the inventive fiber mixture. The values provided in the table are parts by weight relative to 100 parts by weight of rubber in the composition.

In all shown examples the same polymer mixture comprised of natural rubber and styrene-butadiene rubber was used (70:30 parts by weight).

The rubber component for a tire tread rubber mixture can be selected to be different therefrom, but will contain at least one polymer of the following group:

Natural rubber, polyisoprene rubber, cis or vinyl polybutadiene rubber, styrene-butadiene rubber, produced by emulsion or solvent technology, or mixtures thereof, whereby furthermore additions of butylrubber or 3,4-isoprene rubber can be present. In all mentioned rubber mixtures the conventional amounts of carbon black, anti-aging agents, vulcanization chemicals, zinc oxide (zinc white), stearic acid, compounding agents, sulfur etc. are present. Those compositions that had fibers added thereto had a somewhat reduced amount of carbon black in the basic rubber mixture. It should further be noted that not only carbon black but also carbon black in conjunction with other fillers, for example, silica, can be used in the rubber mixtures. It is also possible to completely replace carbon black with silica.

From all formulations laboratory samples were produced and subjected to laboratory tests. The following testing methods were used:

Shore hardness: according to DIN 53 505 at room temperature;

Rebound resilience: according to DIN 53 512;

E' (−20° C.) (Dynamic storage module) and tan δ at 0° C.: measured on an Eplexor device of the company GADUM (Frequency 10 Hz force-constant, static tension 0.64 MP, dynamic tension ±0.38 MP), cylindrical testing body of 10 mm diameter and 10 mm height;

Wear resistance: according to DIN 53 516;

Skid resistance on ice: performed on a British Portable Skid Tester (BPST) at −5° C.

With all formulations tread rubber compositions were produced and used for the manufacture of automobile tires of the size 185/60R14. These tires were tested with respect to traction on snow, braking performance on ice and wet road surfaces with a motor vehicle equipped with antilock brakes.

The values provided in the table are characteristic values relative to the base mixture whose test values were set to 100. Values greater than 100 indicate an improvement of the properties as compared to the base mixture.

The tire testing results show that the tire with the inventive tire tread rubber composition is improved relative to the tires in which the tread composition of the comparative example 1 or the comparative example 2 have been used as well as with respect to the tire with a tread made of the base mixture. A significant improvement could be shown for the inventive rubber composition especially for traction on snow and for braking on ice.

The present invention is, of course, in no way restricted to the specific disclosure of the specification and drawings, but also encompasses any modifications within the scope of the appended claims.

|  | Base Mixture | Comparative Example 1 | Comparative Example 2 | Composition according to Invention |
| --- | --- | --- | --- | --- |
| NR | 70 | 70 | 70 | 70 |
| SBR (Buna SL 704) | 30 | 30 | 30 | 30 |
| N234 | 74 | 69 | 72 | 70 |
| Mineral Oil | 40 | 45 | 41 | 45 |
| Bristles | — | 10 | — | 7 |
| Cellulose Fibers | — | — | 10 | 3 |
| ASM | 4 | 4 | 4 | 4 |
| Activator | 3 | 3 | 3 | 3 |
| Accelerator | 2 | 1.6 | 1.8 | 1.8 |
| Sulfur | 2 | 1.6 | 1.7 | 1.7 |
| Hardness | 61 | 62 | 61 | 60 |
| Rebound Resilience RT | 31 | 32 | 35 | 33 |
| Rebound Resilience 70° C. | 45 | 48 | 49 | 48 |
| Skid Ice (BPST, −5° C., % of base mixture) | 100 | 107 | 105 | 110 |
| E' (−20° C.) | 29.2 | 22.7 | 20.9 | 18.1 |
| tan δ (0° C.) | 0.44 | 0.41 | 0.42 | 0.42 |
| Wear according to DIN | 90 | 105 | 111 | 101 |
| Tire Results |  |  |  |  |
| Traction on Snow | 100 | 102 | 105 | 112 |
| Braking on Ice | 100 | 107 | 105 | 108 |
| Braking on Wet Road | 100 | 97 | 98 | 100 |

What I claim is:

1. A rubber composition for a tire tread, said rubber composition comprising:
   a rubber mixture containing rubber and additives; and
   a fiber mixture of cellulose fibers and keratin fibers in a weight ratio of 1:5 to 5:1 mixed into said rubber mixture;
   said fiber mixture present in said rubber composition in 2 to 25 parts by weight per 100 parts by weight of rubber for improving winter driving performance of the tire tread.

2. A rubber composition according to claim 1, wherein said weight ratio is 3:7 to 2:1.

3. A rubber composition according to claim 1, wherein said fiber mixture is present in said rubber composition in 5 to 15 parts by weight per 100 parts by weight of rubber.

4. A rubber composition according to claim 1, wherein said keratin fibers are selected from the group consisting of wool fibers, human hair, animal hair, and animal bristles.

5. A rubber composition according to claim 1, wherein said cellulose fibers are selected from the group consisting of cotton fibers and coco fibers.

6. A rubber composition according to claim 1, wherein said keratin fibers have a length of 0.5 to 30 mm.

7. A rubber composition according to claim 6, wherein said keratin fibers have a length of 5 to 10 mm.

8. A rubber composition according to claim 1, wherein said cellulose fibers have a length of 0.5 to 30 mm.

9. A rubber composition according to claim 8, wherein said cellulose fibers have a length of 5 to 10 mm.

10. A tire having a tire tread comprised at least partially of a vulcanized rubber composition of claim 1.

* * * * *